United States Patent
Kopp et al.

[11] Patent Number: 5,737,722
[45] Date of Patent: Apr. 7, 1998

[54] PATTERN AND SPEECH RECOGNITION USING GRADIENT-BASED DYNAMICAL REDUCTION OF DP MATCHING SEARCH AREA

[75] Inventors: Dieter Kopp, Hemmingen; Gebhard Thierer, Ditzingen; Gregor Rozinaj, Stuttgart, all of Germany

[73] Assignee: Alcatel N.V., Rijswijk, Netherlands

[21] Appl. No.: 530,079

[22] Filed: Sep. 20, 1995

[30] Foreign Application Priority Data

Sep. 20, 1994 [DE] Germany ............ 44 33 366.8

[51] Int. Cl.⁶ .................................... G10L 5/06
[52] U.S. Cl. .................. 704/241; 704/251; 704/253
[58] Field of Search .................. 395/2.5, 2.51, 395/2.6, 2.62; 704/241, 242, 251, 253, 254

[56] References Cited

U.S. PATENT DOCUMENTS

| | | | |
|---|---|---|---|
| 4,570,232 | 2/1986 | Shikano | 364/513.5 |
| 4,667,341 | 5/1987 | Watari | 704/239 |
| 4,792,976 | 12/1988 | Watari | 704/243 |
| 4,901,352 | 2/1990 | Watari | 381/43 |
| 5,164,990 | 11/1992 | Pazienti et al. | 704/253 |
| 5,577,162 | 11/1996 | Yamazaki | 704/232 |

FOREIGN PATENT DOCUMENTS

| | | |
|---|---|---|
| 0285211 | 10/1988 | European Pat. Off. . |
| 0399452 | 11/1990 | European Pat. Off. . |
| 0614172 | 9/1994 | European Pat. Off. . |

*Primary Examiner*—Allen R. MacDonald
*Assistant Examiner*—Talivaldis Ivars Smits
*Attorney, Agent, or Firm*—Ware, Fressola, Van Der Sluys & Adolphson LLP

[57] ABSTRACT

To determine the degree of correspondence between a first and a second pattern, the first and the second pattern are mapped to n first (V11 to V1n) and m second (V21 to V2m) feature vectors respectively. For points ({1, 1} to {n, m}) in a subarea of a matrix formed by the n first (V11 to V1n) and m second (V21 to V2m) feature vectors, the distance of the respective first (V11 to V1n) and the second (V21 to V2m) feature vectors is computed, and from the mean distance along an optimum path by means of a DP algorithm. Data regarding the gradient of the respective optimum path are determined during the computation for boundary points of the subarea, and the subarea is dynamically reduced for further computations on the basis of these data. The mean distance is used as the degree of correspondence.

12 Claims, 4 Drawing Sheets

PATTERN AND SPEECH RECOGNITION USING GRADIENT-BASED DYNAMICAL REDUCTION OF DP MATCHING SEARCH AREA

TECHNICAL FIELD

The invention concerns a method and a device for determining a degree of correspondence between two patterns, a speech recognition device and a program module therefor.

BACKGROUND OF THE INVENTION

Such a method is described for example in the chapter "7.4.2. Nonlinear Time Adaptation For Predetermined Starting and Ending Points" in the book "Speech Processing" by E. Eppinger and E. Herter, Carl Hanser Publishers, 1993, page 160 to 167.

The method described in this chapter is used for isolated word recognition and serves for the time adaptation and the computation of a time-normalized distance between two word patterns. The two word patterns are separated into small time segments, each of which is described by a small vector. In this way two sequences of vectors are obtained, for example one sequence of n vectors for the first word pattern and one sequence of m vectors for the second word pattern.

The distance between vectors is computed for each vector of one sequence and each vector of the other sequence. In this way a matrix with n×m distance values is obtained. By means of an algorithm, which corresponds to the dynamic programming concept (DP algorithm; described by the above indicated source), a so-called mean distance along an optimum path is computed for each point of the matrix starting from its point {1, 1}. As a result, the mean distance at point {n, m} then provides the time-normalized distance between the two word patterns. The pertinent optimum path represents the imaging function for the time adaptation.

This method has the disadvantage of requiring a large amount of computations, since n×m distance computations and iteration steps of the DP algorithm must be carried out.

The article "Minimum prediction residual principle applied to speech recognition" by F. Itakura, IEEE Trans on ASSP, Volume ASSP-23, 1975, page 67 to 72, further describes that with such a method not all the computations need to be carried out for all points of the matrix, rather that the computations can be restricted to a parallelogram-shaped area around the diagonals between points {1; 1} and {n; m}.

However, with such a restriction the quality of the pattern recognition deteriorates if the starting or ending point of an isolated word is not precisely synchronized.

DISCLOSURE OF INVENTION

The object of the invention is to reduce the computation effort needed to carry out such a method.

The object is fulfilled with a method according to a first aspect of the invention, wherein the first and second patterns are mapped to a plurality of n first feature vectors and to a plurality of m second feature vectors, respectively, with the n first and m second feature vectors forming a matrix with n×m points, wherein for points in a subarea of the matrix, a distance between the respective first and second feature vectors is calculated, wherein from the distances calculated, a mean distance along an optimum path is calculated using a dynamic programming algorithm, and wherein the mean distance at at least one point is evaluated as the degree of correspondence, wherein for boundary points of the subarea, data on a gradient of a respective optimum path is determined during the calculation, and that for further calculation, the subarea is dynamically reduced on the basis of said data.

In accord with a second aspect of the invention, a device for determining a degree of correspondence between a first pattern and a second pattern which are described by n first feature vectors and m second feature vectors, respectively, comprises a control unit, a memory unit for storing the n first and m second feature vectors as well as data associated with points of a matrix formed by the n first and m second feature vectors, a first calculating unit for calculating distances between first and second feature vectors stored in the memory unit, and a second calculating unit for calculating from said distances, for points in a subarea of the matrix determined by the control unit, a mean distance along an optimum path using a dynamic programming algorithm, wherein the second calculating unit is for determining data on a gradient of the respective optimum path during the calculation of the mean distances for boundary points of the subarea, and that the control unit is for dynamically reducing the subarea on the basis of said data for further calculation.

A speech recognition device, according to a third aspect of the invention, comprises an input unit for receiving a speech signal, a converter unit for mapping the speech signal to n first feature vectors, a first memory unit for storing at least one reference pattern described by m second feature vectors, and a pattern recognition facility provided with a first control unit, a second control unit, a first calculating unit, a second calculating unit, and a second memory unit which serves to store the n first and m second feature vectors as well as data associated with points of a matrix formed by the n first and m second feature vectors, the first calculating unit serving to calculate distances between first and second feature vectors stored in the second memory unit, the second calculating unit for calculating from said distances, for points in a subarea of the matrix determined by the second control unit, a mean distance along an optimum path using a dynamic programming algorithm, and the first control unit for deciding on recognition of the speech signal by means of the mean distance at at least one point, characterized in that the second calculating unit is for determining data on a gradient of the respective optimum path during the calculation of mean distances for boundary points of the subarea, and that the second control unit is for dynamically reducing the subarea on the basis of said data for further calculation.

A program module for determining a degree of correspondence between a first pattern and a second pattern which are described by n first feature vectors and m second feature vectors, respectively, said program module containing a set of control instructions which is structured so that, when executed in a device, it controls a sequence of operations in the device such that for points in a subarea of a matrix formed by n first and m second feature vectors, a distance between the respective first and second feature vectors is calculated, that the mean distance along an optimum path is calculated from said distances using a dynamic programming algorithm, and that a mean distance at at least one point is evaluated as the degree of correspondence, characterized in that the set of control instructions is further structured so that, when executed in a device, it controls the sequence of operations in the device such that for boundary points of the subarea, data on a gradient of a respective optimum path is determined during the calculation, and that for further calculation, the subarea is dynamically reduced on the basis of said data.

The invention starts with the knowledge that the optimum path assigned to a point must conform to certain gradient conditions. The basic idea of the invention is that the area of the matrix for which the computations are being performed can further be restricted during the computation, if data are known for boundary points of the gradient of the optimum path assigned to these points. The subsequent boundary points can only be those that conform to these gradient conditions.

An advantage of the invention is that the area of the matrix for which computations must be performed is not rigidly fixed for all patterns, but that it dynamically adapts to the patterns that will be compared. Thus fewer computation steps are needed, thereby accelerating the pattern recognition.

It is particularly suggested at first to restrict the area for which computations must be performed to a limited pentagonal area. This has the advantage that good results can even be expected with poorly synchronized starting and ending points.

These and other objects, features and advantages of the present invention will become more apparent in light of the detailed description of a best mode embodiment thereof, as illustrated in the accompanying drawing.

BEST MODE FOR CARRYING OUT THE INVENTION

The configuration example explains the application of the method of the invention in a speech recognition device according to the invention, which contains a device in accordance with the invention.

However, it is also possible to use the method of the invention to recognize patterns that are not speech patterns. Such patterns could be picture or videophone picture patterns, for example.

Figure 1:
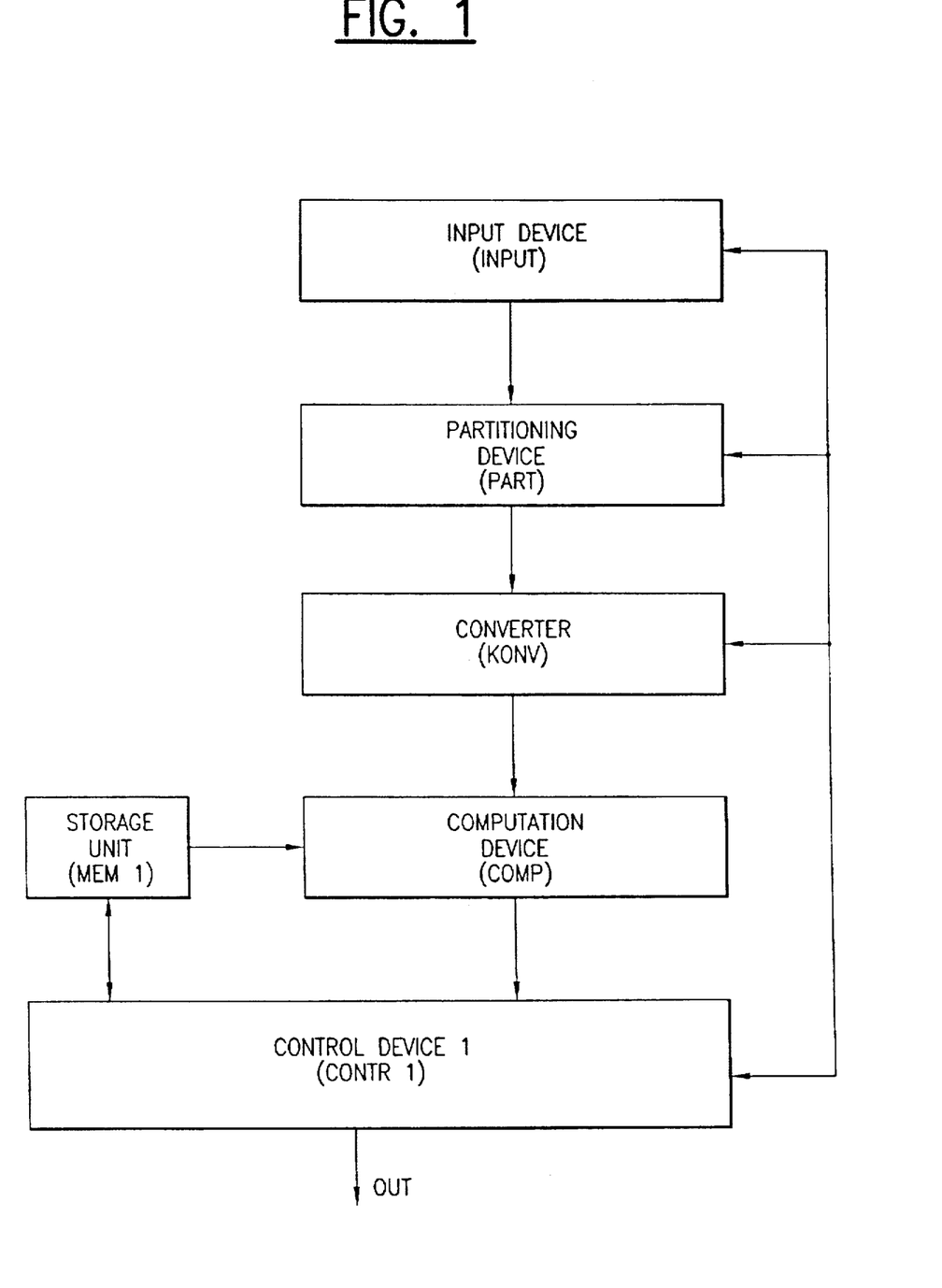
FIG. 1 is a block circuit diagram of a speech recognition device according to the invention with a device according to the invention for determining the degree of correspondence between two patterns.

FIG. 1 illustrates an input device INPUT, a partitioning device PART, a converter unit KONV, a device COMP, a storage unit MEM1 and a control device CONTR1. The control device CONTR1 exchanges control commands with the storage unit MEM1, the device COMP, the converter unit KONV, the partitioning device PART and the input device INPUT. The partitioning device PART receives data from the input device INPUT and sends data to the converter unit KONV. The device COMP receives data from the converter unit KONV and from the storage unit MEM1, and sends data to the control device CONTR1. The control device CONTR1 provides an output signal OUT.

The input device INPUT contains means to receive acoustic signals, converts these signals into analog electrical signals and then performs a conversion into digital electrical signals. It then sends these signals, which correspond to a digital speech pattern, to the partitioning device PART.

The partitioning device PART contains a starting and ending recognition device, whereby it separates the digital speech pattern received from the input device INPUT into word patterns that correspond to isolated words. These word patterns are then sent to the converter unit KONV.

The converter unit KONV partitions the word pattern corresponding to the isolated word into a number of short segments of equal duration. Such a segment has a duration of 10 ms, for example. For each segment, it computes a feature vector which describes the acoustic events in the respective segment and can comprise several speech parameters. For example, such speech parameters could be spectral energies, line predictive coding (LPC) coefficients, cepstrum coefficients or comparable elements. The precise significance of these coefficients is not essential for the invention and is therefore not addressed in greater detail in this case. Here, a feature vector is described by ten LPC coefficients. In this way the converter unit KONV reduces the word pattern of an isolated word to a number of feature vectors, which it then sends to the device COMP.

The storage unit MEM1 is formed of a data bank, in which a number of reference patterns is stored. In this case, each reference pattern represents an isolated word and is also described by a number of feature vectors.

It is also possible for the storage unit MEM1 to store a number of digital word patterns, which are mapped into feature vector sequences by a device that addresses the converter unit KONV, if they are to be sent to the device COMP.

The device COMP computes the time-normalized distance between a reference pattern, which it receives from the storage unit MEM1, and the word pattern, which it receives from the converter unit KONV. In this case it receives both patterns in a description with feature vectors.

The control device CONTR1 controls the operation of the word recognition device. It controls the storage unit MEM1 in such a way, that it sequentially sends the stored reference patterns to the device COMP. From the device COMP it then receives the normalized mean distance between the respective reference pattern and the word pattern. With these data it then decides to which reference word the isolated word best corresponds, and sends a corresponding control signal OUT, which indicates this reference word. It then decides in favor of the reference word for which it has received the smallest normalized mean distance from the device COMP.

Other decision criteria are also possible, for example a comparison of the normalized mean distance with threshold values.

In this way, a speech pattern is received by the input device INPUT and is separated into word patterns by the partitioning device PART. These word patterns are then sequentially reduced by the converter unit KONV into a respective sequence of feature vectors. Each such sequence of feature vectors is then compared in the device COMP with a number of feature vector sequences which correspond to reference patterns, and the control device CONTR1 then decides by means of the respective normalized distance which reference pattern is most similar to the word pattern.

It is also possible for the word recognition device to be constructed differently. It is particularly possible for such a device to utilize other devices as auxiliary decision aids, for example by means of neural networks. It is also possible for example to classify reference patterns as unsuitable right away, when they are described by more than twice or less than half as many feature vectors as the word pattern. This is reported in the following. It is furthermore possible to omit the separation into isolated words, thus the partitioning device PART, and to compute the distance between word sequences by means of the pattern recognition device.

The exact construction of the device COMP will now be made clear by means of FIG. 2.

Figure 2:
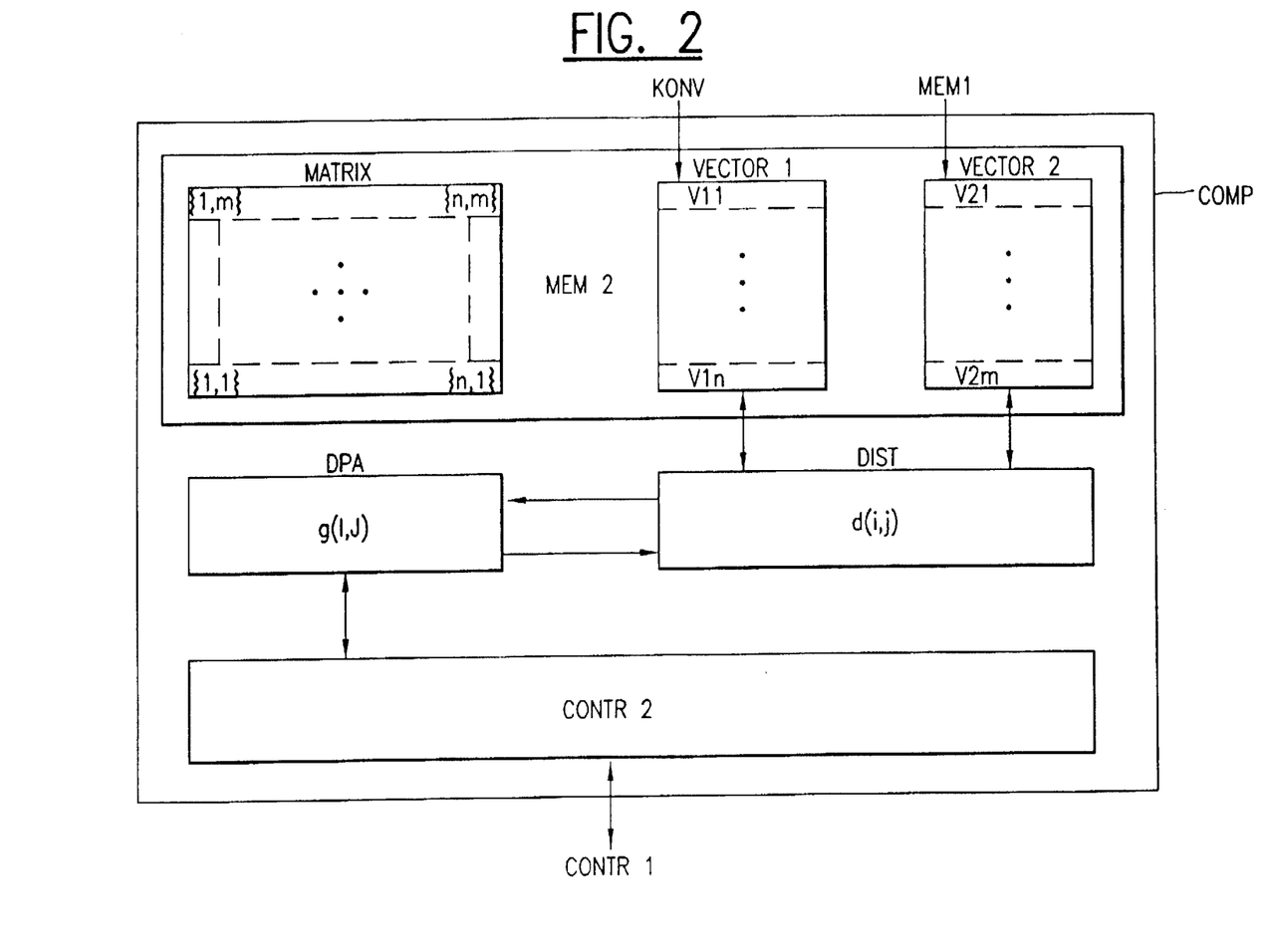
FIG. 2 is a block circuit diagram of the device according to the invention in FIG. 1.

FIG. 2 illustrates the device COMP. It comprises a storage unit MEM2, two computation devices DPA and DIST and a control device CONTR2.

The storage unit MEM2 receives data from the converter unit KONV and from the storage unit MEM1 and exchanges data with the computation devices DPA and DIST. The computation device DPA exchanges data with computation device DIST and with control device CONTR2. The control device CONTR2 exchanges data with the control device CONTR1.

The storage unit MEM2 contains three data sets MATRIX, VECTOR 1 and VECTOR 2.

For example, the data set VECTOR1 contains a sequence of n feature vectors V11 to V1n. This data set describes the word pattern and is sent by the converter unit KONV to the storage unit MEM2, where it is stored.

The data set VECTOR2 also contains a sequence of feature vectors, for example m feature vectors V21 to V2m. It describes the reference pattern and is sent by storage unit MEM1 to storage unit MEM2, where it is stored.

The data set MATRIX contains n×m memory spaces. Each memory space is allocated to one point in a matrix, which therefore addresses this memory space. The n×m memory spaces are addressed by n×m points {1; 1} to {n; m} in this manner.

It is also possible for the memory space allocation to take place dynamically, thus only as many of the n×m memory spaces as are needed are made available for the data set MATRIX. This is particularly advantageous when computations are only performed for part of the matrix, and only the values of this part need to be stored in the data set MATRIX.

The computation device DIST computes the distance between a feature vector from the data set VECTOR1 and a feature vector from the data set VECTOR2. The computation device DPA sends it a request to compute the distance between two feature vectors, in this instance for example between the i-th feature vector V1i of data set VECTOR1 and the j-th feature vector V2j of data set VECTOR2. The computation device DIST then reads these two vectors from the storage unit MEM2 and computes the distance in accordance with the computation formula:

$$d(i,j) = \sum_{k=0}^{9} (LPC_k^A(i) - LPC_k^B(j))^2 \quad \text{Eq. (1)}$$

where $LPC_k^A(i)$ represents the k-th LPC coefficient of feature vector V1i and $LPC_k^B(j)$ represents the k-th LPC coefficient of feature vector V2j. The result of this distance computation is then sent to computation device DPA.

It is also possible to use other distance measures to compute the distance between the feature vectors, for example the absolute value norm. The distance measure being considered then depends especially on the type of speech parameters used for the feature vectors.

The computation device DPA computes the weighted mean value of the distances along an optimum path to a point in the matrix formed by the n feature vectors V11 to V1n of the data set VECTOR1 and the m feature vectors V21 to V2m of the data set VECTOR2. The computation is performed by means of an algorithm which corresponds to the dynamic programming concept (DP algorithm). An accurate description is provided by the already mentioned chapter "7.4.2. Nonlinear Time Adaptation For Predetermined Starting and Ending Points" in the book "Speech Processing" by E. Eppinger and E. Herter, Carl Hanser Publishers, 1993, page 160 to 167.

The weighted mean values are computed in steps, starting with point {1, 1}. The computation device DPA then performs the following computation specification to calculate the weighted mean value at point {I, J}:

$$g(I,J) = \min \begin{bmatrix} g(I,J-1) + d(I,J) \\ g(I-1,J-1) + 2d(I,J) \\ g(I-1,J) + d(I,J) \end{bmatrix} \quad \text{Eq. (2)}$$

The values needed for this computation specification are either read from the data set MATRIX or are requested by the computation device DIST. The result of the computation is then stored in the memory space which is addressed by the point {I, J} in the data set MATRIX.

It is also possible for the computation device DPA to carry out a different computation specification. This is particularly possible if no, or a different, weighting function is used. If no weighting function is used, the following change results for the middle line of the computation specification:

$$g(I-1, J-1)+d(I, J) \quad \text{Eq. (3)}$$

In addition, the computation device DPA stores data regarding the gradient of the allocated optimum path when it computes the weighted mean value for one of the points {1,1} to {n, m}. If the point has been reached from the preceding point on the horizontal path (third line of the computation specified in Equation (2)) or on the vertical path (first line of computation specification (2)), a minus sign is placed before the weighted mean value stored at this point. In the diagonal case (line two of computation specification (2)), the weighted mean value remains unchanged.

It is also possible that even other or additional data regarding the gradient of the optimum path are marked at a point, without marking such data in any other manner. For example, it is possible to mark the mean gradient along the entire optimum path, or a part of the optimum path. The gradient can then for example be marked in the form of a number value at the respective point.

By marking the optimum path gradient at a point, it is possible to further restrict the choice of paths at a point. It was thus determined as a gradient condition, that after a horizontal or a vertical path section, the optimum path must continue diagonally at first. Based on these conditions, the computation specified in Equation (2) could be altered in such a way, that it then only performs computations for one point whose value contains a weighted mean value preceded by a minus sign, if it lies diagonally (second column of computation specified in Equation (2)) with respect to the point.

The control device CONTR2 specifies to the computation device DPA which and in what sequence weighted mean values must be computed. In this way it causes the computation to be performed in columns beginning with point {1, 1}, and that the weighted mean value is not computed for all points {1, 1} to {n, m} in the matrix, rather that these computations are only performed for a partial area of the matrix.

The area in which the computations of the weighted mean value are performed, will now be explained by means of FIG. 3.

Figure 3:
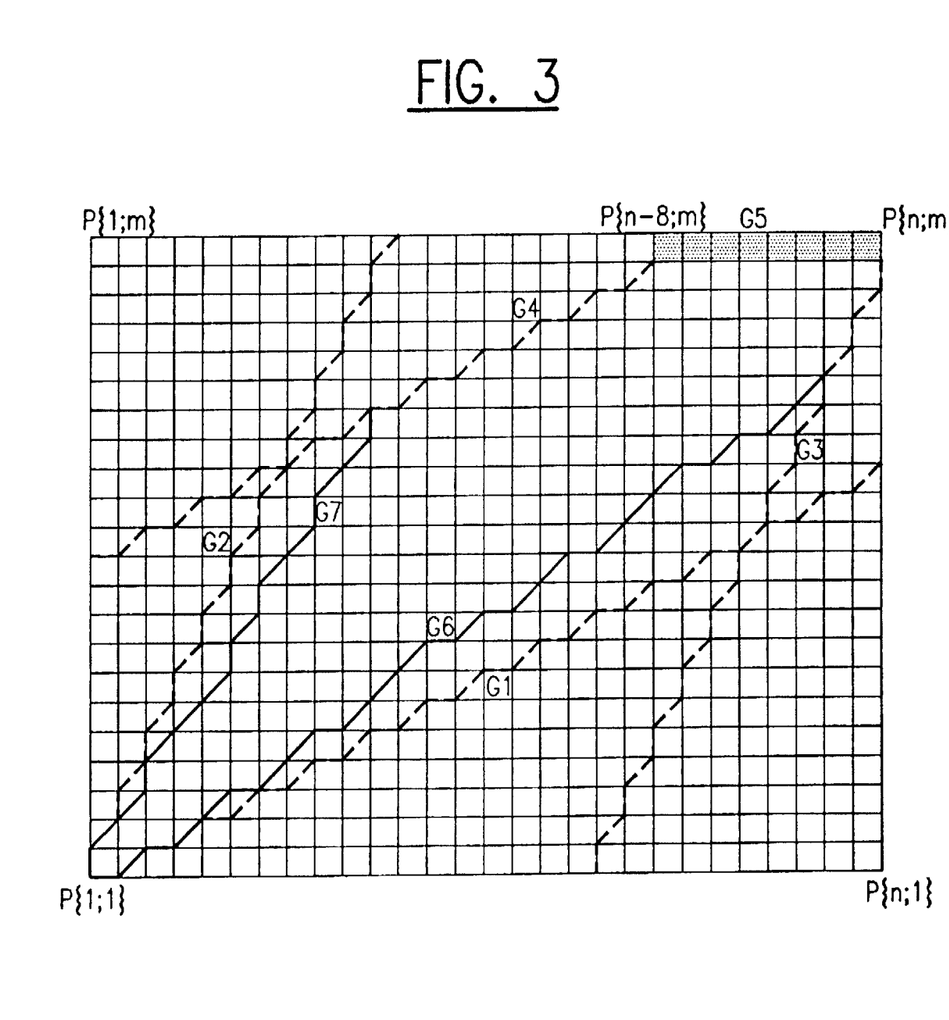
FIG. 3 is a symbolic representation of a matrix and several lines which limit one area of the matrix.

FIG. 3 illustrates the matrix with points {1, 1} to {n, m} and seven lines G1 to G7. The matrix, which addresses the memory spaces of data set MATRIX, is depicted here as a grid, where the crossing points of the grid correspond to the matrix points {1, 1} to {n, m}. Lines G1 to G7 are composed of connection lines between matrix points.

Lines G1 to G5 are chosen so that they approximate straight lines, and thus correspond to straight lines. Line G1 and G2 correspond to straight lines with a gradient of ½ or 2 through the point {1, 1}. Line G4 corresponds to a straight line with a gradient of ½ through the point {n−8, m}. Line G3 corresponds to a straight line with a gradient of 2 through the point {n, m}. Line G5 corresponds to a straight line connecting the two points {n−8, m} and {n, m} with each other. In the same way as lines G1 and G2, lines G6 and G7 pass through point {1, 1}, but have a larger or a smaller gradient than those.

The specification of how lines G6 and G7 are to be constructed will only be explained with the description of the precise operation mode of control device CONTR2.

The points connected by these lines represent boundary points which delimit an area of the matrix. Lines G1 to G5 delimit an area which was predetermined before the start of the computations, namely the maximum area in which computations are performed.

Lines G6 and G7 are formed during the computations and dynamically shrink this maximum area even further. In this way computations are only performed for the area delimited by lines G3 to G7.

It is also possible for the straight lines, to which lines G4 and G5 correspond, not to pass through the point {n−8, m} or {n, m}. The selection of these points depends on the quality of the word pattern, particularly on the quality of the starting and ending point recognition in the partitioning device PART. In this case the value 8 was determined experimentally as a useable value, since the word-end is usually recognized a little too late. The later the word-end is recognized, the farther point {n−8, m} must be shifted to the left. Thus, straight line G4 would have to pass through point {n−10, m}, for example. Inversely, if the word-end is recognized too early, the point {n, m} would have to be shifted to the right, for example to the point {n+2, m}.

It is further possible for the area delimited by lines G1 to G5 before the start of the computations to have another shape. It is especially possible for this area to have the shape of a parallelogram, where lines G3 and G4 meet at point {n, m}. Even a different mean gradient is possible for lines G1 to G5.

The exact operation mode of control device CONTR2 will now be explained in greater detail by means of FIG. 4.

Figure 4:
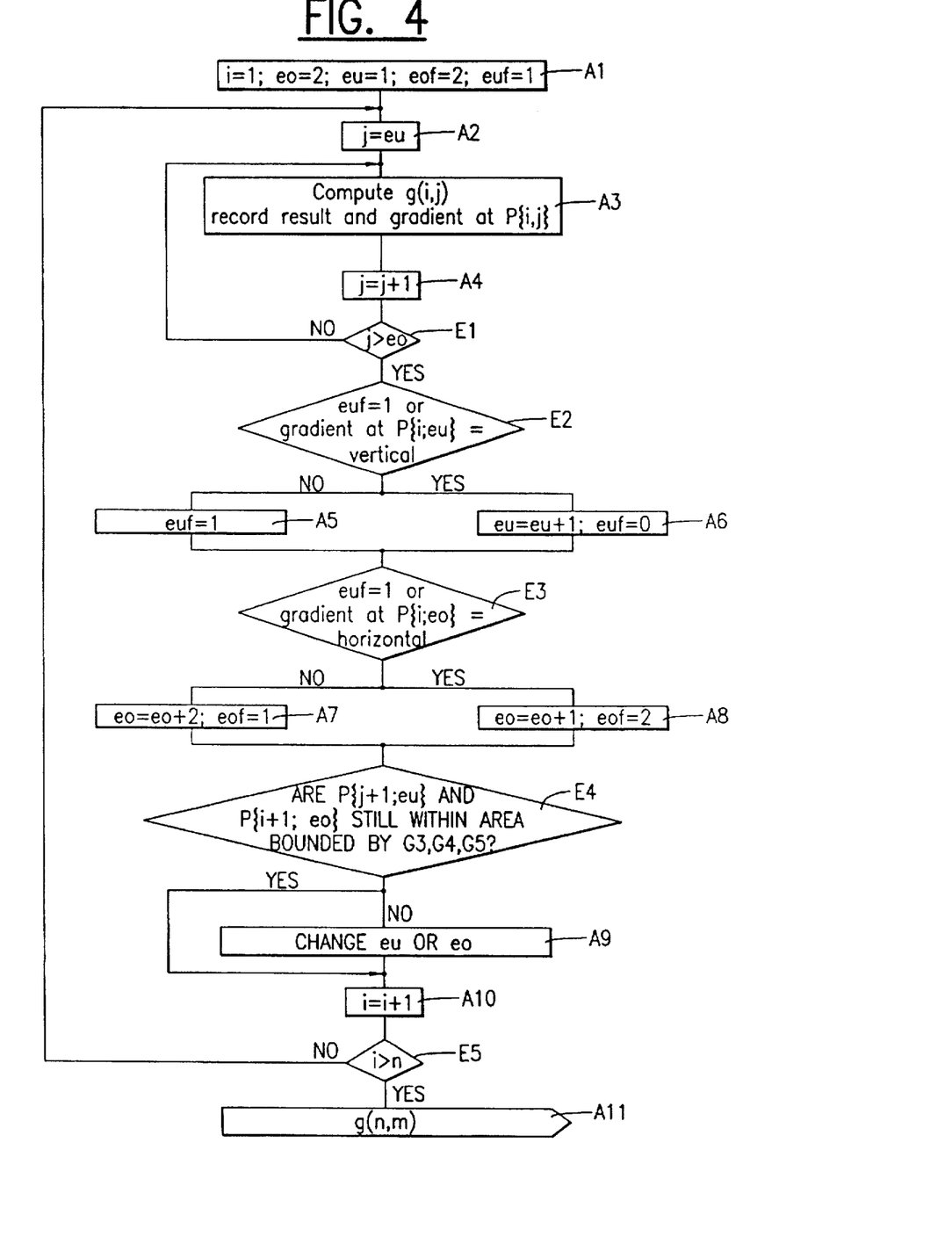
FIG. 4 is a flow diagram illustrating the process of the device in FIGS. 1 and 2.

FIG. 4 depicts a flow diagram which describes the operation mode of control device CONTR2. It comprises several decision steps E1 to E5, several steps A1 to A10 and several parameters i, j, eo, eu, eof, euf and n.

Parameters i and j are counting parameters, where i indicates the current column and j the current line of the matrix. Parameters eo and eu contain the values for the upper or lower limit of the current column of the matrix. Parameters eof and euf are auxiliary parameters which contain the value whereby the upper or the lower limit of the next column must be changed.

In the first step A1, parameters i, eo, eof and euf are set to the starting values 1, 2, 1, 2 or 1. In the second step A2, parameter j is set to the value of parameter eu. In the third step A3, the computation device DPA is instructed to perform the computation specified in Equation (2) for point {i, j} and to record the result and the gradient at that point. In the fourth step A4, the value of parameter j is increased by one. The decision step E1 then checks whether the value of parameter j is greater than that of parameter eo. In the negative case, it causes a return to step A3. In the positive case, decision step E2 is executed. The operation mode of steps A2 to A4 and of decision step E1 is such, that the computation specifications are performed for all points of the i-th column between the upper and lower limits determined by the value of parameters eo and eu. The decision step E2 then determines whether the value of parameter euf is one or the gradient is vertical at point {i, eu}. In the negative case, it branches off to step A5 and otherwise it branches off to step A6. In step A5 the value of parameter euf is set to one. In step A6 the value of parameter eu is increased by one and the value of parameter euf is set to zero. The operation mode of decision step E2 and steps A5 and A6 achieves that parameter eu, which determines the limit of the lower area, as a rule is increased by one during every second pass. If the gradient at point {i, eu} is vertical, this rule is broken and the lower limit is additionally increased. In this way line G6, which describes the lower limit, has a mean gradient of ½ as a rule, but can have a gradient of one when the above gradient condition applies.

The decision step E3 determines whether the value of parameter euf is one, or the gradient is horizontal at point {i, eo}. In the affirmative case, it branches off at step A8 and otherwise at step A7. In step A7 the value of parameter eo is increased by two, and the value of parameter eof is set to one. In step A8 the value of parameter eo is increased by one and the value of parameter eof is set to two. The operation mode of decision element E3 and steps A7 and A8 achieves that the value of parameter eo, which determines the upper limit of the area, is increased alternately as a rule by the value of 1 and the value of 2. The value is increased by one if the above gradient condition applies. In this way line G7, which describes the upper limit, as a rule has a mean gradient of 2, but can obtain a gradient of 1 when the above gradient condition applies.

The decision step E4 determines whether point {i+1, eo}, thus the upper limit of the column to be calculated next, is still in the area delimited by lines G4 and G5 (also see FIG. 3). As already mentioned above, these lines have already been established prior to performing the computations. In the affirmative, it branches off to step A10, otherwise to step A9. In addition, decision step E4 determines whether point {i+1, eu} is located in the area delimited by straight line G3. In the affirmative, it branches off at step A10, otherwise at step A9. In step A9, the value of parameter eu or eo is changed in such a way, that the point of the upper or lower limit is located directly on the respective boundary point determined by straight lines G3 to G5. Thus, decision step E4 and step A9 achieve that the computations are performed for the area delimited by straight lines G3 to G5.

In step A10, parameter i is increased by one. The decision step E5 then determines whether the value of parameter i is greater than that of parameter n. In the affirmative case, it branches off to step A11, otherwise to step A2. The operation mode of step A10 and decision step E5 achieves that the above sequence is carried out for all columns of the matrix to the n-th column.

In step A11, the value of the normalized mean distance at point {n, m} is sent to the control device CONTR2. This value corresponds to the normalized mean distance between the reference pattern and the word pattern.

It is also possible for the speech recognition device of the invention to comprise a computer with the respective peripheral installations. This computer would be controlled by several program modules, which in turn contain a set of control commands that corresponds to a programming language. When configured by the computer, the program modules would control the speech recognition device in accordance with the above operation mode descriptions.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of determining a degree of correspondence between a first pattern indicative of an input signal and a second pattern indicative of a second signal, wherein the first and second patterns are mapped to a plurality of n first feature vectors (V11 to V1n) and to a plurality of m second feature vectors (V21 to V2m), respectively, with the n first and m second feature vectors (V11 to V1n, V21 to V2m) forming a matrix with n×m points ({1, 1} to {n, m});

wherein for points ({1, 1} to {n, m}) in a subarea of the matrix, a distance between the respective first and second feature vectors (V11 to V1n, V21 to V2m) is calculated;

wherein from the distances calculated, a mean distance along an optimum path is calculated using a dynamic programming (DP) algorithm; and wherein the mean distance at at least one point ({n, m}) is evaluated as the degree of correspondence for providing an output signal indicative thereof for deciding on recognition of the input signal as corresponding to said second signal, characterized in that for boundary points of the subarea, data on a gradient of a respective optimum path is determined during the calculation, and that for further calculation, the subarea is dynamically reduced on the basis of said data.

2. A method as claimed in claim 1, characterized in that for the data on the gradient, use is made of information as to whether the optimum path was last diagonal, vertical, or horizontal, and that for further calculation, the subarea is dynamically reduced if the optimum path to a boundary point was last other than diagonal.

3. A method as claimed in claim 1, characterized in that for the data on the gradient, a mean gradient of the respective optimum path is used, and that for further calculation, the subarea is dynamically reduced if the mean gradient determined for an edge point of an upper or lower boundary of the subarea is greater than a predetermined first gradient or less than a predetermined second gradient, respectively.

4. A method as claimed in claim 1, characterized in that for all points ({1, 1} to {n, m}) in the subarea, data on the gradient of the respective optimum path is determined during the calculation, and stored at the respective point ({1, 1} to {n, m}).

5. A method as claimed in claim 4, characterized in that the DP algorithm is performed in columns starting from point {1, 1}, and the data stored in points ({1, 1} to {n, m}) of the preceding column are used for the determination regarding the optimum path.

6. A method as claimed in claim 1, characterized in that at a beginning of the calculation, the subarea is fixed so as to be bounded by a first straight line (G1) in the matrix through a point {1, 1} with a gradient of one-half and a second straight line (G2) in the matrix through a point {1, 1} with a gradient of two.

7. A method as claimed in claim 6, characterized in that at the beginning of the calculation, the subarea is fixed so as to be further bounded by a third straight line (G3) in the matrix through a point {n, m} with a gradient of two and a fourth straight line (G4) in the matrix through a point {n−w, m} with a gradient of ½.

8. A method as claimed in claim 6, characterized in that at a beginning of the calculation, the subarea is fixed so as to be further bounded by a third straight line (G3) in the matrix through the at least one point {n, m} and a point {n−w, m} shifted from the point n by a selected number of points w, said third straight line (G3) having a gradient of two, a fourth straight line (G4) in the matrix through the point {n−w, m} shifted from the point n by the selected number of points w with a gradient of one-half, and a fifth, horizontal straight line (G5) through the point {n−w, m} shifted from the point n by the selected number of points w and the at least one point {n, m}.

9. A method as claimed in claim 8, characterized in that the first pattern represents an unknown isolated word and the second pattern represents a reference word, and that said selected number of points w depends on the quality of the isolated word analysis.

10. A device (COMP) for determining a degree of correspondence between a first pattern indicative of an input signal and a second pattern indicative of a second signal which are described by n first feature vectors (V11 to V1n) and m second feature vectors (V21 to V2m), respectively, comprising:

a control unit (CONTR2);

a memory unit (MEM2) for storing the n first and m second feature vectors (V1i to V1n, V21 to V2m) as well as data associated with points ({1, 1} to {n, m}) of a matrix formed by the n first and m second feature vectors (V11 to V1n, V21 to V2m);

a first calculating unit (DIST) for calculating distances between first and second feature vectors (V11 to V1n, V21 to V2m) stored in the memory unit (MEM2); and a second calculating unit (DPA) for calculating from said distances, for points ({1, 1} to {n, m}) in a subarea of the matrix determined by the control unit (CONTR2), a mean distance along an optimum path using a dynamic programming (DP) algorithm as a degree of correspondence for providing an output signal indicative thereof for deciding on recognition of the input signal as corresponding to said second signal, characterized in that the second calculating unit (DPA) is for determining data on a gradient of the respective optimum path during the calculation of the mean distances for boundary points of the subarea, and that the control unit (CONTR2) is for dynamically reducing the subarea on the basis of said data for further calculation.

11. A speech recognition device comprising:

an input unit (INPUT) for receiving a speech signal;

a converter unit (KONV) for mapping the speech signal to n first feature vectors (V11 to V1n);

a first memory unit (MEM1) for storing at least one reference pattern described by m second feature vectors (V21 to V2m); and a pattern recognition facility provided with:

a first control unit (CONTR1);

a second control unit (CONTR2);

a first calculating unit (DIST);

a second calculating unit (DPA); and a second memory unit (MEM2) which serves to store the n first and m second feature vectors (V11 to V1n, V21 to V2m) as well as data associated with points ({1, 1} to {n, m}) of a matrix formed by the n first and m second feature vectors (V11 to V1n, V21 to V2m), the first calculating unit (DIST) serving to calculate distances between first and second feature vectors (V11 to V1n, V21 to V2m) stored in the second memory unit (MEM2), the second calculating unit (DPA) for calculating from said distances, for points ({1, 1} to {n, m}) in a subarea of the matrix determined by the second control unit (CONTR2), a mean distance along an optimum path using a dynamic programming (DP) algorithm, and the first control unit (CONTR1) for deciding on recognition of the speech signal by means of the mean distance at at least one point ({n, m}), characterized in that the second calculating unit (DPA) is for determining data on a gradient of the respective optimum path during the calculation of mean distances for boundary points of the subarea, and that the second control unit (CONTR2) is for dynamically reducing the subarea on the basis of said data for further calculation.

12. A program module for determining a degree of correspondence between a first pattern indicative of an input signal and a second pattern indicative of a second signal which are described by n first feature vectors (V11 to V1n) and m second feature vectors (V21 to V2m), respectively, said program module containing a set of control instructions which is structured so that, when executed in a device, it controls a sequence of operations in the device such that for points ({1, 1} to {n, m}) in a subarea of a matrix formed by n first and m second feature vectors (V11 to V1n, V21 to V2m), a distance between the respective first and second feature vectors (V11 to V1n, V21 to V2m) is calculated, that the mean distance along an optimum path is calculated from said distances using a dynamic programming (DP) algorithm, and that a mean distance at at least one point ({n, m}) is evaluated as the degree of correspondence for providing an output signal indicative thereof for deciding on recognition of the input signal as corresponding to said second signal, characterized in that the set of control instructions is further structured so that, when executed in a device, it controls the sequence of operations in the device such that for boundary points of the subarea, data on a gradient of a respective optimum path is determined during the calculation, and that for further calculation, the subarea is dynamically reduced on the basis of said data.

* * * * *

UNITED STATES PATENT AND TRADEMARK OFFICE
CERTIFICATE OF CORRECTION

PATENT NO. : 5,737,722
DATED : April 7, 1998
INVENTOR(S) : Kopp et al.

It is certified that error appears in the above-identified patent and that said Letters Patent is hereby corrected as shown below:

Column 10, line 30 (claim 10, line 10) replace "Vli" with --V11--

Signed and Sealed this

Eleventh Day of August 1998

Attest:

BRUCE LEHMAN

*Attesting Officer*      *Commissioner of Patents and Trademarks*